United States Patent [19]
Keating

[11] 3,918,163
[45] Nov. 11, 1975

[54] DISTANCE MEASURING DEVICES
[75] Inventor: Francis J. Keating, Lake Forest, Ill.
[73] Assignee: Francis J. Keating, Lake Forest, Ill.
[22] Filed: July 5, 1974
[21] Appl. No.: 485,894

Related U.S. Application Data
[63] Continuation-in-part of Ser. No. 436,869, Jan. 28, 1974, abandoned.

[52] U.S. Cl. .................................................. 33/142
[51] Int. Cl.² .......................................... G01B 3/12
[58] Field of Search ...... 33/141 R, 142, 147 L, 132, 33/141.5, 133, 124

[56]  References Cited
UNITED STATES PATENTS
| | | | |
|---|---|---|---|
| 1,942,130 | 1/1934 | Woodcock | 33/141 R |
| 2,416,772 | 3/1947 | Reece | 33/141 R |
| 3,494,039 | 2/1970 | Porter | 33/142 |

Primary Examiner—Richard E. Aegerter
Assistant Examiner—Willis Little
Attorney, Agent, or Firm—Kinzer, Plyer, Dorn & McEachran

[57] ABSTRACT

A distance measuring device for use in measuring distances on different scale maps, including an input wheel for following a path to be measured along the map, coupled to and driving an output indicator including an output readout register showing the total path length, in which the driving relationship between the input wheel and the output readout register can be varied by adjusting an intermediate scale wheel. A preferred distance measuring device includes a secondary scale means whereby the rate of speed along the path may be entered into the device and may be constantly varied, and a secondary output indicator which indicates the time for traveling the given distance at the entered rates of speeds.

25 Claims, 11 Drawing Figures

DISTANCE MEASURING DEVICES

This application is a continuation-in-part of my application Ser. No. 436,869 filed Jan. 28, 1974, now abandoned.

BACKGROUND OF THE INVENTION

This invention relates generally to measuring devices and more particularly concerns a distance measuring device which is adjustable for use with different scale maps, and a preferred distance measuring device which allows the rate of speed to be entered into the device and which allows readout of the time for travelling the distance at the rate of speed. Accordingly, devices constructed in accordance with the present invention are usually useable with different scale maps, and the preferred devices can give time readouts when the distance is travelled at different speeds.

As people travel today, with gas shortages possible and with gas mileage increasingly critical, it becomes important to accurately determine the distance which will be travelled. Although maps are often produced with large scales and with adequate mileage information, it is still quite difficult for a map user to accurately guage the mileage to be traveled on a trip. This is mainly due to curved roads, intersections and hard-to-measure road alignments.

A similar problem occurs in the measuring of direct course distances in naval or aerial navigation. This is accomplished by adjusting a pair of dividers to a map scale, then applying the dividers to a course line on the map. The several manual operations involved in this procedure each create a possibility of error, particularly if the navigator is distracted at any point in the process.

Problems also occur in determining the time it will take to travel the distance if the rate of speed along the path varies or the average rate of speed is not known.

Accordingly, this invention provides a distance measuring device for use in measuring distances upon maps from one point to another point, following complex paths, which is adjustable for different map scales. It is necessary to have a scale adjustment feature or the measuring device would be useable only with one map scale, which would make it necessary to have a different device for each different map scale. Even a single road map usually has various scale maps upon it; for instance, a map of a state usually is accompanied by larger scale maps of the larger cities in the state. The instant device accomplishes distance measurements by incorporating an input wheel which can be rolled over the desired path and an output indicator from which the distance can be read. It also includes a scale adjustment indicator which can be adjusted for use with different map scales.

This invention also provides secondary scale means which allow the rate of speed which the path will be travelled at to be entered into the device and indicates the time it takes to travel the path at the speeds entered.

SUMMARY OF THE INVENTION

In accordance with the invention, a distance measuring device for use with different map scales includes an input wheel for following the exact path to be measured along the map, a drive wheel connected to the input wheel and rotatably driven by the input wheel and including a flat circular surface, a scale wheel rotatable at approximately a right angle to and driven by the flat circular surface of the drive wheel, a scale axle approximately parallel to the flat surface of the drive wheel and which is rotatably driven by the scale wheel, the scale wheel being slidably connected to scale axle to allow movement of the scale wheel parallel to the flat surface of the drive wheel, an output indicator coupled in driven relation to the scale axle and including an output readout register, and a housing for all of the wheels and axle with appropriate rotatable connections and including an input wheel opening to allow the input wheel to extend beyond the housing and contact the map and a scale wheel opening to allow sliding of the scale wheel along the scale axle and a means for viewing the output readout register. Additionally, the measuring device includes a scale indicator which is slidably mounted in the housing so as to slide parallel to the scale axle and including a means for sliding the scale wheel along the scale axle.

A preferred distance measuring device includes additionally to the preceding paragraph a secondary flat surface coupled in driven relation to the scale axle, a secondary adjust or scale wheel rotatable at approximately a right angle to and driven by the secondary flat surface, a secondary adjust or scale axle approximately parallel to the secondary flat surface which is rotatably driven by the secondary adjust wheel, the secondary adjust wheel being slidably connected to the secondary adjust axle to allow movement of the secondary adjust wheel parallel to the secondary flat surface, a secondary output indicator coupled in driven relation to the secondary adjust axle and including a secondary output readout register, and the housing further includes a secondary adjust wheel opening to allow sliding of the secondary adjust wheel along the secondary adjust axle and a means for viewing the secondary output readout register.

BRIEF DESCRIPTION OF THE DRAWINGS

Other objects and advantages of the invention will become apparent upon reading the following detailed description and upon reference to the drawings in which:

FIG. 11 is a sectional view of the device of FIG. 9 taken approximately along line 11—11 of FIG. 9.

DETAILED DESCRIPTION OF THE INVENTION

FIGS. 1 through 4 show a measuring device 10 constructed in accordance with one embodiment of the present invention. Measuring device 10 includes a front portion 12 and a rear portion 13 which are joined to form a housing 11. Housing 11 includes an input wheel opening 14, a scale wheel opening 15 and an output indicator viewing means 16.

An input wheel 20 is rotatably connected to housing 11 by a bushing means 21 and is positioned to extend beyond housing 11 through input wheel opening 14 so it can connect a map 22. When using measuring device 11, only merely rolls input wheel 20 along the desired path to be measured on a map. Input wheel 20 is preferably made of a material with a high friction coefficient so that it will not slip as it is rolled along the map surface. Input wheel 20 rotatably drives the drive wheel 23 and its flat circular surface 25. Preferably, input wheel 20 is connected to drive wheel 23 by an input connecting wheel 24 which rotates as input wheel 20 rotates and has a peripheral portion 24A affording a series of gear teeth which intermesh with a set of gear teeth formed in the outer portion 23A of drive wheel 23. Although an intermeshing gear connection between input connection wheel 24 and drive wheel 23 is preferred, any accurate rotatable connection between the two wheels can be utilized such as a belt drive or a friction drive.

Drive wheel 23 is quite large and essentially determines the size of housing 11 of measuring device 10. Drive wheel 23 is mounted on a main axle 26 which is located approximately in the center of housing 11. Main axle 26 is designed so that the drive wheel can rotate freely around it, and can be simply a cylindrical rod with a diameter slightly smaller than an axial opening in the center of the drive wheel. Similarly, main axle 26 is preferably rotatably mounted into indentations 12A and 13A in respective housing portions 12 and 13. If desired, main axle 26 may be molded integrally with one of the housing pieces, being stationary but allowing the drive wheel to rotate about it.

Figures 3, 4, 5, 6:
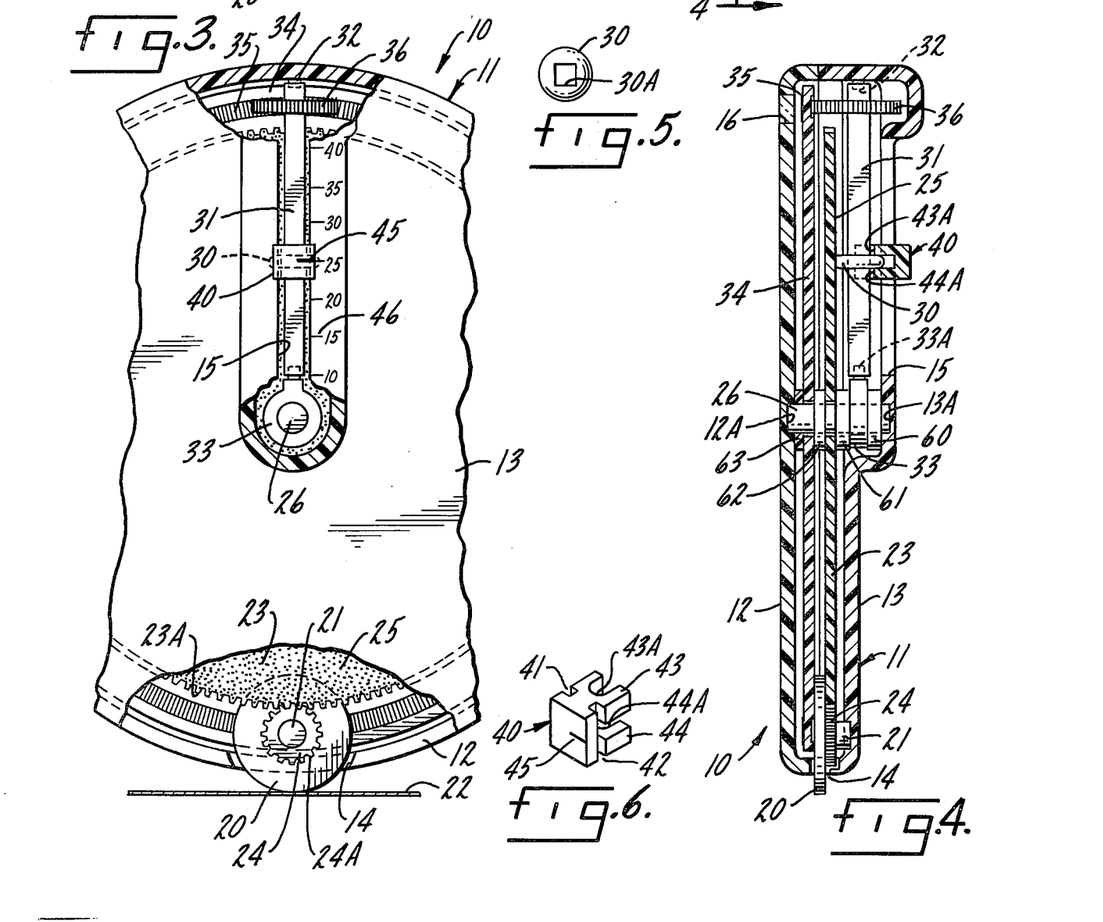
FIG. 3 is an enlarged and partially cut away rear elevation of the device of FIG. 1.
FIG. 4 is a partial sectional view of the device of FIG. 1 taken approximately along line 4—4 of FIG. 2.
FIG. 5 is a plan view of one embodiment of a scale wheel employed in the measuring device of FIGS. 1–4.
FIG. 6 is a perspective view of a scale indicator for the device of FIGS. 1–4.

A scale wheel 30, best seen in FIG. 5, is positioned in housing 11 and bears against the flat surface 25 of drive wheel 23. This is accomplished by means of a scale axle 31 which is rotatably mounted substantially parallel to the flat surface 25 of wheel 23. One means of mounting incorporates a bearing post 32 upon which one end of scale axle 31 can rotate and a bearing 33 with bearing post 33A upon which the other end of scale axle 31 can rotate. Bearing 33 is rotatably mounted on main axle 26. In a preferred embodiment, scale wheel 30 is constructed with a periphery made of rubber or other material having a high friction coefficient and is provided with a center opening 30A (FIG. 5) which matches the cross-sectional shape of the scale axle 31. Since it is desired to have scale wheel 30 cause rotation of scale axle 31, the cross-section of scale axle 31 and center opening 30A are shaped so that rotation will be imparted to scale axle 31. A preferred sectional shape of scale axle 31 is that of a square with a corresponding square center opening 30A in scale wheel 30.

Scale wheel 30 is mounted so that it can slide axially along scale axle 31. A rubber-surfaced scale wheel with opening 30A will be capable of sliding along scale axle 31 in a direction parallel to the flat circular surface 25 of drive wheel 23. A preferred construction incorporates a scale wheel made of a material with a high coefficient of friction for contact with the drive wheel, while the scale axle is made of a material with a low coefficient of friction to allow sliding of the scale wheel. As scale wheel 30 slides along scale axle 31, it traces different size circles on the flat circular surfaces 25. For a given rotational speed of drive wheel 23, the number of revolutions of scale wheel 30 and scale axle 31 per revolution of drive wheel 23 will vary depending on the axial displacement of scale wheel 30 along scale axle 31. The flat surface 25 may be coated with a high friction coefficient material to insure positive friction contact with scale wheel 30.

An output indicator 34 is coupled in driven relation to scale axle 31. Preferably, output indicator 34 rotates around main axle 26. An output readout register 35 is located on one surface of output indicator 34 and is visible through output indicator viewing means 16. The output readout register 35 can display distance in miles, kilometers, or whatever units are desired. Dual readings, in both miles and kilometers, can be presented on a single register 35 if deemed necessary. Furthermore, more than one output readout register can be utilized, depending on the size of output indicator 34. A preferred means of connecting output indicator 34 and scale axle 31 is by an axle wheel 36. The connection between axle wheel 36 and output indicator 34 can be by friction or gears or any other desired method.

The scale wheel opening 15 allows adjustment of scale wheel 30 along scale axle 31 so as to easily vary the scale adjustment for measuring device 10. Preferably, a map scale indicator 40 is slidably mounted in scale wheel opening 15 and includes a means for sliding scale wheel 30 along scale axle 31. FIG. 6 shows a perspective view of a preferred scale indicator 40, including sliding channels 41 and 42 which allow the scale indicator 40 to be mounted in housing 11 and scale wheel guide arms 43 and 44 which are separated to allow scale wheel 30 to rotate freely between them. Arms 43 and 44 extend around and overlap the sides of scale wheel 30, enabling indicator 40 to slide scale wheel 30 along scale axle 31. The curved inner portions 43A and 44A of the scale guide arms 43 and 44 are curved to allow the square scale axle 31 to rotate freely. Indicator 40 has a gauge mark 45 which is aligned with a graduated map scale readout register 46 on housing 11, which extends along scale opening 15. The map-scale readout register 46 corresponds to the relationship between input wheel 20 and the output indicator register 35, so that for a given position of scale wheel 30 and for a given amount of rotation of input wheel 20, output indicator 34 and readout register 35 will move by a given amount relative to each other.

In considering the overall operation of device 10, it may be assumed that scale indicator 40 is set at a map-scale of 25 miles per inch, on map scale register 46, as shown in FIG. 3. Accordingly, for every inch that the input wheel 20 moves in tracing a route on a map drawn to this scale, a distance of 25 miles is registered on the output indicator readout register 35. For a map drawn to a different scale, one simply adjusts the indicator 40 to the appropriate miles per inch ratio. Of course, measuring device 10 can be designed to be used with any input and output and might have another output readout scale (not shown) which is graduated in feet so that when the scale indicator 40 was set at 25, the output indicator readout would register 25 feet for every inch that input wheel 20 traced. An unlabeled output indicator readout can be employed, since the user can remember what the units of measurement are and simply set the scale indicator 40 in the appropriate ratio.

Figure 1:
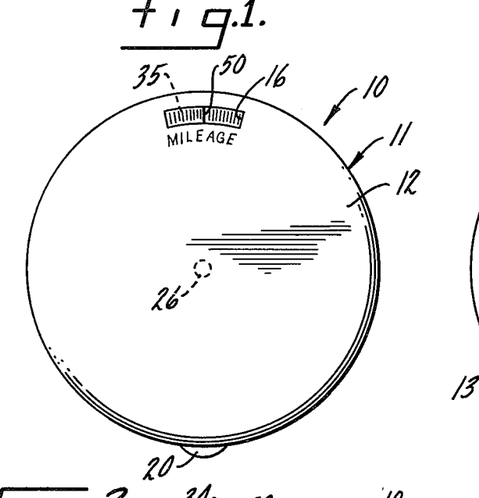
FIG. 1 is a front elevation of a measuring device constructed in accordance with one embodiment of the present invention.
Figure 2:
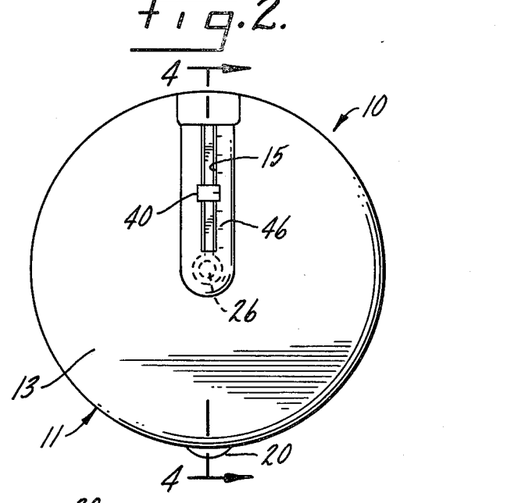
FIG. 2 is a rear elevation of the device of FIG. 1.

A preferred means for viewing output indicator 34 incorporates a clear window allowing view of output indicator readout register 35 with an indicator point 50 at the center of the window. The points where indicator point 50 crosses register 35 are noted at the beginning of the measurement and at the end of the measurement. For example, if register 35 shows 42 miles at the start of the measurement, the user pushes the input wheel 20 along the desired path and reads the final mileage, for example 97, and merely subtracts the starting mileage from the final mileage to give a distance of 55 miles.

The spacing of the appropriate wheels and axles within housing 11 is best described in accordance with the assembly of device 10. Assembly starts with the rear portion 13 of housing 11, into which scale indicator 40 is snapped and main axle 26 is placed. A first spacing bushing 60 is slid upon main axle 26 to provide a proper spacing between bearing 33 and rear portion 13. The end of scale axle 31 with axle wheel 36 is placed on bearing post 32 and scale wheel 30 is slid over the free end of scale axle 31 and aligned with scale indicator 40. Bearing 33 is then slid on main axle 26 and aligned to lock scale axle 31 rotatably into position. A second spacing bushing 61 is then placed on main axle 26 to space bearing 33 from drive wheel 23. Drive wheel 23 is slid on main axle 26 so that its flat surface 25 contacts scale wheel 30. A third spacing bushing 62 is placed over main axle 26 to provide spacing between drive wheel 23 and output indicator 34. Output indicator 34 is slid over main axle 26 so that readout register 35 will be viewable through the output indicator viewing means 16 and so connection is made with axle wheel 36. A fourth spacing bushing 63 is placed over main axle 26 to provide a space between output indicator 34 and front housing portion 12. Finally, the front housing portion 12 is put into place locking main axle 26 into position. Preferably, spacing bushing 60 is made of a high friction coefficient material to help bearing 33 keep from rotating around main axle 26. Scale axle 31 is further made so that bearing posts 32 and 33A tend to keep bearing 33 from rotating. Spacing bushings 61, 62 and 63 are all preferably made of a material with a low coefficient of friction so that the wheels which they separate may rotate easily.

In other constructions, certain parts can be integrally molded with the main axle. For example bearing 33 could be molded as a part of the main axle and bushing 60 would be unnecessary. In a preferred construction output indicator 34 is molded integrally with main axle 26, thus eliminating bushing 63. Some of the bushings may be molded into the side of a wheel if desired. The mode of assembly in either instance is appropriately modified so as to assemble the bushings and other wheels on the integrally molded main axle 26 - output indicator 34 prior to the insertion of the main axle into the housing. Of course, in all instances the input wheel 20 is mounted on its bushing 21 at any convenient point. In a preferred construction, the output indicator 34 and drive wheel 23 help align input wheel 20, as shown in FIG. 4.

Figure 7:
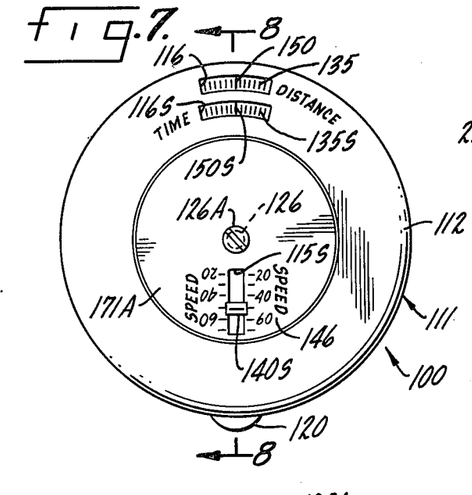
FIG. 7 is a front elevation of a measuring device constructed in accordance with a second embodiment of the present invention.
Figures 8, 10:
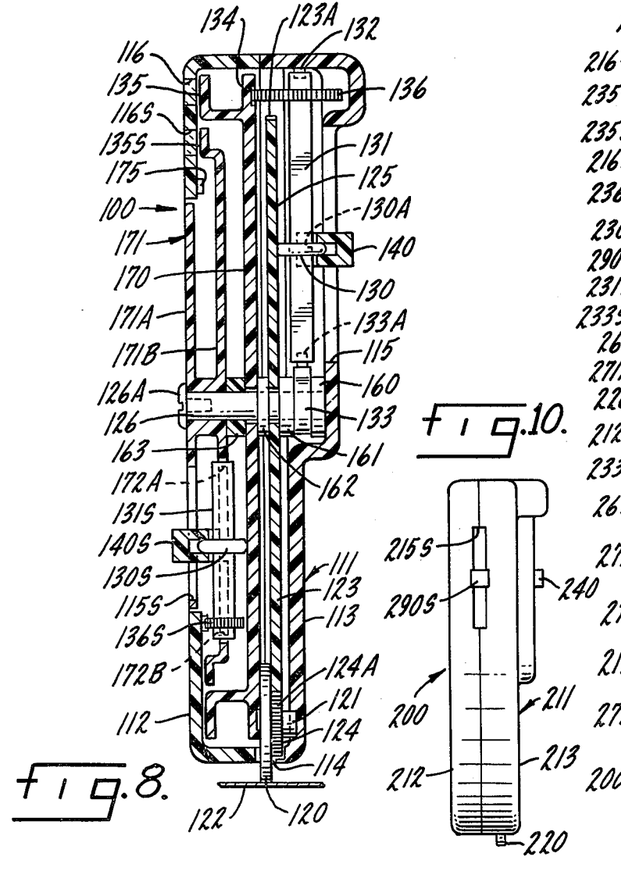
FIG. 8 is a sectional view of the device of FIG. 7 taken approximately along line 8—8 of FIG. 7.
FIG. 10 is a side elevation of the device of FIG. 9.

FIGS. 7 and 8 show a measuring device 100 constructed in accordance with a further embodiment of the present invention. Measuring device 100 includes a front portion 112 and a rear portion 113 which are joined to form a housing 111. Housing 111 includes an input wheel opening 114, a scale wheel opening 115, an output indicator viewing means 116 and secondary output indicator viewing means 116S.

An input wheel 120 is rotatably connected to housing 111 by a bushing means 121 and is positioned to extend beyond housing 111 through input wheel opening 114 so it can contact a map 122. When using measuring device 111, one merely rolls input wheel 120 along the desired path to be measured on a map. Input wheel 120 is preferably made of a material with a high friction coefficient so that it will not slip as it is rolled along the map surface. Input wheel 120 rotatably drives the drive wheel 123 and its flat circular surface 125. Preferably, input wheel 120 is connected to drive wheel 123 by an input connecting wheel 124 which rotates as input wheel 120 rotates and has a peripheral portion 124A affording a series of gear teeth which intermesh with a set of gear teeth formed in the outer portion 123A of drive wheel 123. Although an intermeshing gear connection between input connection wheel 124 and drive wheel 123 is preferred, any accurate rotatable connection between the two wheels can be utilized such as a belt drive or a friction drive.

Drive wheel 123 is quite large and essentially determines the size of housing 111 of measuring device 100. Drive wheel 123 is mounted on a main axle 126 which is located approximately in the center of housing 111. Main axle 126 is designed so that the drive wheel can rotate freely around it, and can be simply a cylindrical rod with a diameter slightly smaller than an axial opening in the center of the drive wheel. Main axle 126 is molded integrally with housing portion 113, being stationary but allowing the drive wheel to rotate about it.

A scale wheel 130 is positioned in housing 111 and bears against the flat surface 125 of drive wheel 123. This is accomplished by means of a scale axle 131 which is rotatably mounted substantially parallel to the flat surface 125 of wheel 123. One means of mounting incorporates a bearing post 132 upon which one end of scale axle 131 can rotate and a bearing 133 with bearing post 133A upon which the other end of scale axle 131 can rotate. Bearing 133 is similarly mounted around main axle 126. In a preferred construction, scale wheel 130 is constructed with a periphery made of rubber or other material having a high friction coefficient and is provided with a center opening which matches the cross-sectional shape of scale axle 131. Since it is desired to have scale wheel 130 cause rotation of scale axle 131, the cross-section of scale axle 131 and center opening 130A are of a shape so that rotation will be imparted to scale axle 131. A preferred sectional shape of scale axle 131 is that of a square with a corresponding square center opening 130A in scale wheel 130 similar to the relation between scale axle 31 and opening 30A of the embodiment of FIGS. 1–6.

Scale wheel 130 is mounted so that it can slide axially along scale axle 131. A rubber-surfaced scale wheel 130 with opening 130A will be capable of sliding along scale axle 131 in a direction parallel to the flat circular surface 125 of drive wheel 123. A preferred construction incorporates a scale wheel made of a material with a high coefficient of friction for contact with the drive wheel, while the scale axle is made of a material with a low coefficient of friction to allow sliding of the scale wheel. As scale wheel 130 slides along scale axle 131, it traces different size circles on the flat circular surface 125. For a given rotational speed of drive wheel 123, the number of revolutions of scale wheel 130 and scale axle 131 per revolution of drive wheel 123 will vary depending on the axial displacement of scale wheel 130 along scale axle 131. In a preferred construction, the flat surface 125 is coated with a high friction coefficient material to insure positive friction contact with scale wheel 130.

An output indicator 134 is coupled in driven relation to scale axle 131. Preferably, output indicator 134 rotates around main axle 126. An output readout register 135 is located on one surface of output indicator 134 and is visible through output indicator viewing means 116. The output readout register 135 can display distance in miles, kilometers, feet or whatever units are desired. Dual readings, in both miles and kilometers, can be presented on a single register 135 if deemed necessary. Furthermore, more than one output readout register can be utilized, depending on the size of output indicator 134. A preferred means of connecting output indicator 134 and scale axle 131 is by an axle wheel 136. The connection between axle wheel 136 and output indicator 134 can be by friction or gears or any other desired method.

The scale wheel opening 115 allows adjustment of scale wheel 130 along scale axle 131 so as to easily vary the scale adjustment for measuring device 100. Preferably, a map scale indicator 140 is slidably mounted in scale wheel opening 115 and includes a means for sliding scale wheel 130 along scale axle 131. Map scale indicator 140 can be the same as that shown in FIG. 6. Indicator 140 has a gauge mark which is aligned with a graduated map scale readout register on housing 111 which extends along scale opening 115. The map-scale readout register corresponds to the relationship between input wheel 120 and the output indicator register 135, so that for a given position of scale wheel 130 and for a given amount of rotation of input wheel 120, output indicator 134 and readout register 135 will move a related amount.

The preferred embodiment of FIGS. 7 and 8 also includes a rate of speed input which can be adjusted to the speeds at which given portions of the path will be travelled and the time it takes to travel the path at the given speeds is indicated. To accomplish this, a secondary flat surface 170 is coupled in driven relation to scale axle 131. A secondary drive wheel with a secondary flat surface 170 other than output indicator 134 and rotatably coupled to scale axle 131 may be used. Preferably, output indicator 134 includes secondary flat surface 170 coupled in driven relation to scale axle 131. Secondary flat surface 170 is preferably quite similar in construction to the flat circular surface 125 of drive wheel 123. A secondary adjust wheel 130S rotates at approximately a right angle to and is driven by secondary flat surface 170. Secondary adjust wheel 130S is slidably connected to the secondary adjust axle or secondary scale axle 131S which is mounted approximately parallel to secondary flat surface 170 of output indicator 134 and which is rotatably driven by secondary adjust wheel 130S. Secondary adjust wheel 130S is slidably connected to secondary adjust axle 131S to allow movement of secondary adjust wheel 130S parallel to secondary flat surface 170.

Secondary adjust axle 131S is rotatably mounted on the secondary output indicator 171. Secondary output indicator 171 is generally in the form of a wheel which rotates around main axle 126 and includes a secondary output register 135S upon which units of time are indicated. Secondary output indicator 171 is formed of two wheel-like disks 171A and 171B. Secondary adjust axle 131S is rotatably mounted in disk 171B parallel to secondary flat surface 170 by bearing posts 172A and 172B. Disk 171A has an opening 115S in which a secondary adjust indicator 140S can slide and thereby slide secondary adjust wheel 130S along secondary adjust axle 131S in a direction parallel to secondary flat surface 170. Secondary adjust indicator or secondary scale indicator 140S is similar in construction to scale indicator 40 and essentially secondary adjust elements 140S, 130S and 131S correspond and work together similar to scale elements 40, 30 and 31. Outer disk 171A of secondary output indicator 171 is conveniently molded to provide a flush front cover for the device and will rotate freely from front housing portion 112. A speed indication scale 146 may be indicated along secondary adjust opening 115S so that a user may readily adjust the speed input.

A secondary rotation wheel 136S rotates with secondary adjust axle 131S and drives along path 175 which is formed in front housing portion 112. Thus, the rate of revolutions of secondary rotation wheel 136S will determine the rate of revolution of secondary output indicator 171. The rotation of secondary rotation wheel 136S is in turn determined by the position of secondary adjust wheel 130S along secondary adjust axle 131S which will cause the secondary adjust wheel 130S to trace different radius paths along secondary flat surface 170.

In considering the overall operation of device 100, it may be assumed that scale indicator 140 is set at a map-scale of 25 miles per inch. Accordingly, for every inch that the input wheel 120 moves, in tracing a route on a map drawn to this scale, a distance of 25 miles is registered on the output indicator readout register 135. For a map drawn to a different scale, one simply adjusts the indicator 140 to the appropriate ratio. An unlabled output indicator readout can be employed using numbers without distance units, since the user can remember what the units of measurement are and simply set the scale indicator 140 in the appropriate ratio.

For a 10 mile trip with a 2 mile portion travelled at 50 miles per hour, a 3 mile portion travelled at 40 miles per hour, and a 5 mile portion travelled at 30 miles per hour, secondary adjust indicator 140S would be set at the given rate of speed along secondary speed scale readout register 146 while the portion of the path was travelled. Secondary output register 135S will indicate the elapsed time from the start of the path when travelled at the given rates of speed. Similarly, in sailing the speed rate may be indicated by adjusting the secondary adjust indicator for upwind, downwind and various courses may be charted; likewise in car ralleys distance and time figures are extremely important and the device of the invention provides extremely quick and easy calculations.

A preferred means for viewing secondary output register 135S and output indicator readout register 135 incorporates a clear window with the indicator lines 150S and 150 at the center of the window. The points where indicators 150 and 150S cross registers 135 and 135S are noted in the beginning of the measurement and at the end of the measurement. For example, if register 135S shows 42 minutes at the start of the measurement, the user pushes the input wheel 120 along the desired path and reads the final time, for example 97 minutes, and merely subtracts the starting time from the final time to get the elapsed time for travelling the path at the desired rate of speed.

The spacing of the appropriate wheels and axles within housing 111 is best described in accordance with the assembly of device 100. Assembly starts with the rear portion 113 of housing 111, into which scale indicator 140 is snapped. Main axle 126 is integrally molded or formed in rear portion 113. A first spacing bushing 160 is slid upon main axle 126 to provide a proper spacing between bearing 133 and rear portion 113. The end of scale axle 131 with axle wheel 136 is placed on bearing post 132 and scale wheel 130 is slid over the free end of scale axle 131 and aligned with scale indicator 140. Bearing 133 is then slid on main axle 126 and aligned to lock scale axle 131 rotatably into position. A second spacing bushing 161 is then placed on main axle 126 to space bearing 133 from drive wheel 123. Drive wheel 123 is slid on main axle 126 so that its flat surface 125 contacts scale wheel 130. A third spacing bushing 162 is placed over main axle 126 to provide spacing between drive wheel 123 and output indicator 134. The input wheel 120 is now conveniently placed on bushing 121. Output indicator 134 is slid over main axle 126 so that readout register 135 will be viewable through the output indicator viewing means 116 and so connection is made with axle wheel 136. A fourth spacing bushing 163 is placed over main axle 126 to provide a space between output indicator 134 and secondary output indicator 171. Secondary output indicator 171 has secondary scale indicator 140S snapped into place in conjunction with secondary adjust wheel 130S and secondary adjust axle 131S. Secondary output indicator is then placed around main axle 126 so that secondary adjust wheel 130S contacts secondary flat surface 170. Retainer 162A is then firmly attached to main axle 126 to hold all the various wheels and bearings rotatably in place on main axle 126. Finally, the front housing portion 112 is put into place so that path 175 contacts secondary drive wheel 136S. Preferably, spacing bushing 160 is made of a high friction coefficient material to help bearing 133 keep from rotating around main axle 126. Scale axle 131 is further made so that bearing posts 132 and 133A tend to keep bearing 133 from rotating. Spacing bushings 161, 162 and 163 are all preferably made of a material with a low coefficient of friction so that the wheels which they separate may rotate easily.

Figure 9:
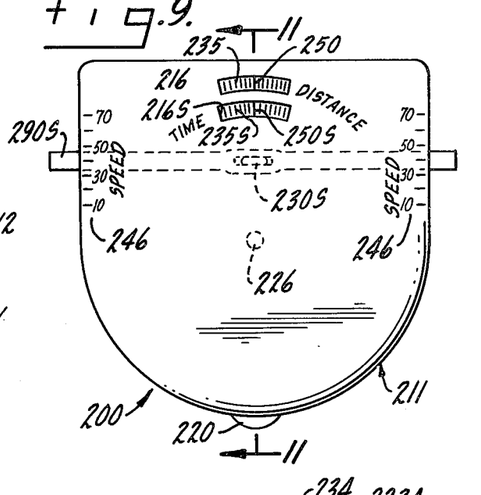
FIG. 9 is a front elevation of a further measuring device constructed in accordance with the present invention.

FIGS. 9, 10 and 11 show a measuring device 200 constructed in accordance with yet another embodiment of the present invention. Measuring device 200 includes a front portion 212 and a rear portion 213 which are joined to form a housing 211. Housing 211 includes an input wheel opening 214, a scale wheel opening 215, an output indicator viewing means 216 and secondary output indicator viewing means 216S.

An input wheel 220 is rotatably connected to housing 211 by a bushing means 221 and is positioned to extend beyond housing 211 through input wheel opening 214 so it can contact a map 222. When using measuring device 211, one merely rolls input wheel 220 along the desired path to be measured on a map. Input wheel 220 is preferably made of a material with a high friction coefficient so that it will not slip as it is rolled along the map surface. Input wheel 220 rotatably drives the drive wheel 223 and its flat circular surface 225. Preferably, inpuut wheel 220 is connected to drive wheel 223 by an input connecting wheel 224 which rotates as input wheel 220 rotates and has a peripheral portion 224A affording a series of gear teeth which intermesh with a set of gear teeth formed in the outer portion 223A of drive wheel 223. Although an intermeshing gear connection between input connection wheel 224 and drive wheel 223 is preferred, any accurate rotatable connection between the two wheels can be utilized such as a belt drive or a friction drive.

Drive wheel 223 is connected to a main axle 226 which is located approximately in the center of housing 211. Main axle 226 is designed so that the drive wheel can rotate freely around it, and can be simply a cylindrical rod with a diameter slightly smaller than an axial opening in the center of the drive wheel. Main axle 226 may be molded integrally with housing portion 213, being stationary but allowing the drive wheel to rotate about it, but preferably is mounted into indentations 212A and 213A in respective housing portions 212 and 213.

A scale wheel 230 is positioned in housing 211 and bears against the flat surface 225 of drive wheel 223. This is accomplished by means of a scale axle 231 which is rotatably mounted substantially parallel to the flat surface 225 of wheel 223. One means of mounting incorporates a bearing post 232 upon which one end of scale axle 231 can rotate and a bearing 233 with bearing post 233A upon which the other end of scale axle 231 can rotate. Bearing 233 is rotatably mounted on main axle 226. In a preferred construction, scale wheel 230 is constructed with a periphery made of rubber or other material having a high friction coefficient and is provided with a center opening which matches the cross-sectional shape of scale axle 231. Since it is desired to have scale wheel 230 cause rotation of scale axle 231, the cross-section of scale axle 231 and center opening 230A are of a shape so that rotation will be imparted to scale axle 231. A preferred sectional shape of scale axle 231 is that of a square with a corresponding square center opening 230A in scale wheel 230 similar to the relation between scale axle 31 and opening 30A of the embodiment of FIGS. 1–6.

Scale wheel 230 is mounted so that it can slide axially along scale axle 231. A rubber-surfaced scale wheel 230 with opening 230A will be capable of sliding along scale axle 231 in a direction parallel to the flat circular surface 225 of drive wheel 223. A preferred construction incorporates a scale wheel made of a material with a high coefficient of friction for contact with the drive wheel, while the scale axle is made of a material with a low coefficient of friction to allow sliding of the scale wheel. As scale wheel 230 slides along scale axle 231, it traces different size circles on the flat circular surface 225. For a given rotational speed of drive wheel 223, the number of revolutions of scale wheel 230 and scale axle 231 per revolution of drive wheel 223 will vary depending on the axial displacement of scale wheel 230 along scale axle 231. In a preferred construction, the flat surface 225 is coated with a high friction coefficient material to insure positive friction contact with scale wheel 230.

An output indicator 234 is coupled in driven relation to scale axle 231. Preferably, output indicator 234 rotates around main axle 226. An output readout register 235 is located on one surface of output indicator 234 and is visible through output indicator viewing means 216. The output readout register 235 can display distance in miles, kilometers, feet or whatever units are desired. Dual readings, in both miles and kilometers, can be presented on a single register 235 if deemed necessary. Furthermore, more than one output readout register can be utilized, depending on the size of output indicator 234. A preferred means of connecting output indicator 234 and scale axle 231 is by an axle wheel 236. The connection between axle wheel 236 and output indicator 234 can be by friction or gears or any other desired method.

The scale wheel opening 215 allows adjustment of scale wheel 230 along scale axle 231 so as to easily vary the scale adjustment for measuring device 200. Preferably, a map scale indicator 240 is slidably mounted in scale wheel opening 215 and includes a means for sliding scale wheel 230 along scale axle 231. Map scale indicator 240 can be the same as that shown in FIG. 6. Indicator 240 has a gauge mark which is aligned with a graduated map scale readout register on housing 211 which extends along scale opening 215. The map-scale readout register corresponds to the relationship between input wheel 220 and the output indicator register 235, so that for a given position of scale wheel 230 and for a given amount of rotation of input wheel 220, output indicator 234 and readout register 235 will move a related amount.

The preferred embodiment of FIGS. 9, 10 and 11 also includes a rate of speed input which can be adjusted to the speeds at which given portions of the path will be travelled and the time it takes to travel the path at the given speeds is indicated. To accomplish this, a secondary flat surface 270 is coupled in driven relation to scale axle 231. A secondary drive wheel with a secondary flat surface 270 other than output indicator 234 and rotatably coupled to scale axle 231 may be used. Preferably, output indicator 234 includes secondary flat surface 270 coupled in driven relation to scale axle 231. Secondary flat surface 270 is preferably quite similar in construction to the flat circular surface 225 of drive wheel 223. A secondary adjust wheel 230S rotates at approximately a right angle to and is driven by secondary flat surface 270. Secondary adjust wheel 230S is slidably connected to the secondary adjust axle or secondary scale axle 231S which is mounted approximately parallel to secondary flat surface 270 of output indicator 234 and which is rotatably driven by secondary adjust wheel 230S. Secondary adjust wheel 230S is slidably connected to secondary adjust axle 231S to allow movement of secondary adjust wheel 230S parallel to secondary flat surface 270.

Secondary adjust axle 231S is rotatably mounted between a secondary bearing post 232S and a secondary bearing 233S. Secondary output indicator 271 is generally in the form of a wheel which rotates around main axle 226 and includes a secondary output register 235S upon which units of time are indicated. Secondary adjust axle 231S is rotatably mounted parallel to secondary flat surface 270 by bearing post 232S and 233SA. Front housing portion 212 has openings 215S in which a secondary adjust indicator or secondary scale indicator 290S can slide and thereby slide secondary adjust wheel 230S along secondary adjust axle 231S in a direction parallel to secondary flat surface 270. Secondary adjust indicator 290S is in the form of a long bar with a central opening to allow secondary adjust wheel 230S and secondary adjust axle 231S to rotate freely in the opening. The walls of the opening allow secondary adjust wheel 230S to be slid along the secondary scale axle 231S when secondary adjust indicator 290S is moved along openings 215S (only one of which is shown, FIG. 10). Essentially, secondary adjust elements 290S, 230S and 231S correspond and work together similar to scale elements 40, 30 and 31. A speed indication scale 246 may be indicated along secondary adjust opening 215S so that a user may readily adjust the speed input.

A secondary rotation wheel 236S rotates with secondary adjust axle 231S and drives along path 275 which is formed in secondary output indicator 271. Thus, the rate of revolutions of secondary rotation wheel 236S will determine the rate of revolution of secondary output indicator 271. The rotatation of secondary rotation wheel 236S is in turn determined by the position of secondary adjust wheel 230S along secondary adjust axle 231S which will cause the secondary adjust wheel 230S to trace different radius paths along secondary flat surface 270.

In considering the overall operation of device 200, it may be assumed that scale indicator 240 is set at a map-scale of 25 miles per inch. Accordingly, for every inch that the input wheel 220 moves, in tracing a route on a map drawn to this scale, a distance of 25 miles is registered on the output indicator readout register 235. For a map drawn to a different scale, one simply adjusts the indicator 240 to the appropriate ratio.

For a 10 mile trip with a 2 mile portion travelled at 50 miles per hour, a 3 mile portion travelled at 40 miles per hour, and a 5 mile portion travelled at 30 miles per hour, secondary adjust indicator 290S would be set at the given rate of speed along secondary speed scale readout register 246 while the portion of the path was travelled. Secondary output register 235S will indicate the elapsed time from the start of the path when travelled at the given rates of speed. Similarly, in sailing the speed rate may be indicated by adjusting the secondary adjust indicator for upwind, downwind and various courses may be charted; likewise in car ralleys distance and time figures are extremely important and the device of the invention provides extremely quick and easy calculations.

A preferred means for viewing secondary output register 235S and output indicator readout register 235 incorporates a clear window with indicator lines 250S and 250 at the center of the window. The points where indicators 250 and 250S cross registers 235 and 235S are noted in the beginning of the measurement and at the end of the measurement. For example, if register 235S shows 42 minutes at the start of the measurement, the user pushes the input wheel 220 along the desired path and reads the final time, for example 97 minutes, and merely subtracts the starting time from the final time to get the elapsed time for travelling the path at the desired rate of speed.

The spacing of the appropriate wheels and axles within housing 211 is best described in accordance with the assembly of device 200. Assembly starts with the rear portion 213 of housing 211, into which scale indicator 240 is snapped. Main axle 226 is placed in rear portion 213 at indentation 213A. A first spacing bushing 260 is slid upon main axle 226 to provide a proper spacing between bearing 233 and rear portion 213. The end of scale axle 231 with axle wheel 236 is placed on bearing post 232 and scale wheel 230 is slid over the free end of scale axle 231 and aligned with scale indicator 240. Bearing 233 is then slid on main axle 226 and aligned to lock scale axle 231 rotatably into position. A second spacing bushing 261 is then placed on main axle 226 to space bearing 233 from drive wheel 223. Drive wheel 223 is slid on main axle 226 so that its flat surface 225 contacts scale wheel 230. A third spacing bushing 262 is placed over main axle 226 to provide spacing between drive wheel 223 and output indicator 234. The input wheel 220 is now conveniently placed on pivot 221. Output indicator 234 is slid over main axle 226 so that readout register 235 will be viewable through the output indicator viewing means 216 and so connection is made with axle wheel 236. A fourth spacing bushing 263 is placed over main axle 226 to provide a space between output indicator 234 and secondary bearing 233S. Secondary scale wheel 230S is placed in the central opening of secondary adjust indicator 290S and secondary adjust axle 231S is slid through the central opening of the secondary adjust indicator 290S and the center opening of secondary scale wheel 230S. Secondary bearing 233S is placed on main axle 226 and the end of secondary scale axle 231S opposite secondary drive wheel 236S is placed on secondary bearing post 233SA. A fifth spacing bushing 264 is placed on main axle 226 to separate secondary bearing 233S and secondary output indicator 271. Secondary output indicator 271 is then placed on main axle 226. Finally, front housing portion 212 is put in place with secondary bearing post 232S inserted into the end of secondary axle 231S so that secondary axle wheel 236S is in contact with path 275 and so that secondary adjust wheel 230S is in contact with secondary flat surface 270. Secondary adjust indicator 290S will be locked slidably between the front and rear housing portions. Main axle 226 will fit into indentation 212A and the lip 271A will space secondary output indicator from the inside wall of front portion 212.

Preferably, spacing bushing 260 is made of a high friction coefficient material to help keep bearing 233 from rotating around main axle 226. Scale axle 231 is further made so that bearing posts 232 and 233A tend to keep bearing 233 from rotating. Spacing bushings 261, 262, 263 and 264 are all preferably made of a material with a low coefficient of friciton so that the wheels which they separate may rotate easily.

I claim:

1. A distance measuring device for use with different scale maps, comprising:
    an input wheel for following a path to be measured along the map;
    a drive wheel connected to said input wheel and rotatably driven by said input wheel, and including a flat surface;
    a main axle on which said drive wheel is mounted and about which said drive wheel rotates;
    a scale wheel rotatable at approximately a right angle to and driven by the flat surface of said drive wheel;
    a scale axle approximately parallel to the flat surface of said drive wheel which is rotatably driven by said scale wheel, said scale wheel being mounted about and slidably connected to said scale axle to allow movement of said scale wheel parallel to the flat surface of said drive wheel;
    an output indicator journalled on said main axle and drive means coupled between said output indicator and scale axle, said scale axle including, an output readout register; and
    a housing for said wheels and axles, said housing having an interior area coplanar with said drive wheel and including an input wheel opening to allow said input wheel to extend beyond the housing and contact the map, a scale wheel opening to allow access to said scale wheel to slide said scale wheel along said scale axle, and means for viewing the output readout register said drive wheel substantially filling said interior area of the housing and said main axle being generally centrally located in the housing.

2. A distance measuring device as in claim 1, including:
    a scale indicator which is slidably mounted in said housing so as to slide parallel to said scale axle and including a means for sliding said scale wheel along said scale axle.

3. A distance measuring device as in claim 2 wherein said housing includes a scale readout register corresponding to the relationship between said input wheel and said output readout register when said scale wheel is in a given position along said scale axle.

4. A distance measuring device as in claim 1 wherein said scale axle and said output indicator are coupled in driven relation by an axle wheel rotatable as said scale axle rotates.

5. A distance measuring device as in claim 1 wherein said output indicator is a wheel mounted parallel to and closely spaced from said drive wheel.

6. A distance measuring device as in claim 5 wherein said housing includes an indicator which aligns with the output readout register and indicates the appropriate value of the output readout register.

7. A distance measuring device as in claim 4 wherein said output indicator is coaxial with said drive wheel and substantially as large as said interior area of the housing.

8. A distance measuring device as in claim 7 wherein the drive wheel and output indicator are both mounted for rotation about said main axle.

9. A distance measuring device as in claim 1 wherein said flat surface of said drive wheel incorporates a material with a high coefficient of friction.

10. A distance measuring device as in claim 1 wherein said input wheel incorporates a material with a high coefficient of friction.

11. A distance measuring device as in claim 1 wherein said scale axle has a square cross-sectional shape which corresponds to a square center opening in said scale wheel.

12. A distance measuring device as in claim 1 wherein said scale wheel is made of a material with a high coefficient of friction and said scale axle is made of a material with a low coefficient of friction.

13. A distance measuring device as in claim 1, including:
    a secondary flat surface coupled in driven relation to said scale axle;
    a secondary scale wheel rotatable at approximately a right angle to and driven by said secondary flat surface;
    a secondary scale axle approximately parallel to said secondary flat surface which is rotatably driven by said secondary scale wheel, said secondary scale wheel being slidably connected to said secondary scale axle to allow movement of said secondary scale wheel parallel to said secondary flat surface;
    a secondary output indicator coupled in driven relation to said secondary scale axle and including a secondary output readout register; and,
    wherein said housing includes a secondary scale wheel opening to allow sliding of said secondary scale wheel along said secondary scale axle and a means for viewing the secondary output readout register.

14. A distance measuring device as in claim 13 wherein said housing includes a secondary scale readout register corresponding to the relationship between said secondary flat surface and said secondary output indicator when said secondary scale wheel is in a given position along said secondary scale axle.

15. A distance measuring device as in claim 11 wherein said output indicator is a wheel substantially as large as said interior area of the housing, said output indicator being mounted coaxial with, parallel to and closely spaced from said drive wheel.

16. A distance measuring device as in claim 15 wherein said secondary flat surface is formed on said output indicator.

17. A distance measuring device as in claim 15 wherein:
said secondary scale axle is rotatably mounted in said secondary output indicator.

18. A distance measuring device as in claim 17 including:
a path formed in said housing; and,
said secondary scale axle includes a secondary scale wheel rotatable as said secondary scale axle rotates which is in contact with and travels on said path.

19. A distance measuring device as in claim 18, including:
a secondary scale indicator which is slidably mounted in said secondary output indicator so as to slide parallel to said secondary scale axle and including a means for sliding said scale wheel along said secondary scale axle.

20. A distance measuring device as in claim 15 including:
a main axle upon which said drive wheel rotates; and,
said secondary scale axle is rotatably mounted between said housing and said main axle.

21. A distance measuring device as in claim 15, including:
a secondary axle wheel on said secondary scale axle; and,
a path formed on said secondary output indicator and said secondary axle wheel is in contact with and travels on said path.

22. A distance measuring device as in claim 15, including:
a secondary scale indicator which is slidably mounted in said housing so as to slide parallel to said secondary scale axle and including a means for sliding said secondary scale wheel along said secondary scale axle.

23. A distance measuring device as in claim 15 wherein said secondary scale axle has a square cross-sectional shape which corresponds to a square center opening in said secondary scale wheel.

24. A distance measuring device as in claim 23 wherein said secondary output indicator is a wheel mounted coaxial with and parallel to said drive wheel.

25. A distance measuring device as in claim 24 wherein said drive wheel, output indicator and secondary output indicator are all axially mounted for rotation about said main axle.

* * * * *